(12) United States Patent
Kikuchi et al.

(10) Patent No.: US 10,594,881 B2
(45) Date of Patent: Mar. 17, 2020

(54) IMAGE READER

(71) Applicant: SEIKO EPSON CORPORATION, Tokyo (JP)

(72) Inventors: Koichi Kikuchi, Matsumoto (JP); Yoshikazu Nagai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/394,801

(22) Filed: Apr. 25, 2019

(65) Prior Publication Data
US 2019/0335049 A1 Oct. 31, 2019

(30) Foreign Application Priority Data

Apr. 27, 2018 (JP) .................................. 2018-087157

(51) Int. Cl.
*H04N 1/00* (2006.01)

(52) U.S. Cl.
CPC ..... *H04N 1/00594* (2013.01); *H04N 1/00588* (2013.01); *H04N 1/00663* (2013.01); *H04N 1/00737* (2013.01); *H04N 1/00816* (2013.01)

(58) Field of Classification Search
CPC ........... H04N 1/00594; H04N 1/00588; H04N 1/00737; H04N 1/00816; H04N 1/00663; H04N 1/00543; H04N 1/00591; H04N 1/00631; H04N 2201/0081; B65H 29/14; B65H 29/70; B65H 3/06; B65H 3/063; B65H 3/0653; B65H 1/022; B65H 1/02; B65H 31/02; B65H 31/22; B65H 2801/39; B65H 2402/46; B65H 2402/343; B65H 2405/324; B65H 2405/1114; B65H 2405/11164; B65H 2511/12;
(Continued)

(56) References Cited

U.S. PATENT DOCUMENTS

| | | | |
|---|---|---|---|
| 2005/0017441 A1* | 1/2005 | Sugiyama | B65H 7/02 271/264 |
| 2005/0035527 A1* | 2/2005 | Oomori | B65H 1/00 271/10.09 |

(Continued)

FOREIGN PATENT DOCUMENTS

| | | |
|---|---|---|
| JP | 2014-012594 A | 1/2014 |
| JP | 2015-050582 A | 3/2015 |
| JP | 2015-211450 A | 11/2015 |

*Primary Examiner* — Allen H Nguyen
(74) *Attorney, Agent, or Firm* — Workman Nydegger

(57) ABSTRACT

An image reader includes: a document transport path that is extended along a horizontal direction when the reader has a first posture and that transports the document; a transport roller that transports the document in the document transport path; a rotation-contact member document path rotating to have a posture in which a contact portion that comes into contact with the document blocks the document transport path and a posture in which the contact portion opens the document transport path; path A rotation center of the rotation-contact member is positioned on an upper side of the document transport path in the first posture and the contact portion projects from the upper side toward a lower side of the document transport path. A center-of-gravity position of the rotation-contact member is on a lower side from the rotation center in the first posture.

8 Claims, 19 Drawing Sheets

(58) Field of Classification Search
CPC ........ B65H 2511/22; B65H 2301/4212; B65H 2301/51214
USPC ................................................ 358/474, 1.14
See application file for complete search history.

(56) References Cited

U.S. PATENT DOCUMENTS

| | | | |
|---|---|---|---|
| 2011/0228350 A1* | 9/2011 | Wakaura | G01C 9/06 358/474 |
| 2014/0042695 A1* | 2/2014 | Maejima | B65H 29/14 271/314 |
| 2015/0062662 A1 | 3/2015 | Ito | |
| 2015/0319322 A1 | 11/2015 | Kanaya | |
| 2017/0126912 A1* | 5/2017 | Shuto | B65H 3/063 |
| 2017/0275114 A1* | 9/2017 | Matsui | B65H 1/12 |

* cited by examiner

IMAGE READER

The present application is based on, and claims priority from JP Application Serial Number 2018-087157, filed Apr. 27, 2018, the disclosure of which is hereby incorporated by reference herein in its entirety.

BACKGROUND

1. Technical Field

The present disclosure relates to an image reader that reads the document.

2. Related Art

JP-A-2014-012594 discloses a document scanner as an example of an image reader. The document scanner is small and used by being placed on a desk or being carried outside.

A sensor, which detects that the document is inserted, is provided in an document transport path through which the document is transported. In JP-A-2014-012594, an entry sensor 113 corresponds to the sensor. In addition, JP-A-2014-012594 provides the description that the entry sensor 113 may be any sensor such as a reflective optical sensor, a transmissive optical sensor, or a lever-type contact sensor.

From a viewpoint of suppressing costs of a reader or from a viewpoint of suppressing false detection, it is preferable that the sensor be a lever-type contact sensor. However, when the sensor is used in a reader like the scanner disclosed in JP-A-2014-012594, which is small and used by being placed on a desk or being carried outside, the following specific technical problems arise.

In other words, in a configuration in which the lever-type contact sensor is employed, a contact lever generally maintains a posture of blocking the document transport path by a pressing unit such as a spring. A leading end of the document pushes up the contact lever against a spring force, and thereby it is possible to detect passing of the leading end of the document.

Here, when a posture of the reader changes, the contact lever retracts from the document transport path due to action of gravity depending on the posture, and thus a shape of the contact lever or a spring force for pressing the contact lever needs to be determined in consideration for not only one installation posture but also other installation postures.

When a state continues for a long period, in which the contact lever moves against a force that causes the contact lever to retract from the document transport path due to the action of gravity, and a spring causes the contact lever to project to the document transport path, there is a concern that, as time passes, a balance will be lost between a force by which the contact lever retracts from the document transport path due to the action of gravity and a force by which the spring causes the contact lever to project to the document transport path, and thus it is not possible to appropriately maintain the posture of the contact lever.

In addition, when the spring force of the spring increases, there is a concern that a force necessary for the leading end of the document to push up the contact lever will increase, thus, it is not possible for the leading end of the document having the low stiffness to push up the contact lever, and jam will occur. When the spring force of the spring is set to the minimum necessary degree in order to avoid such a problem, a very delicate balance is kept between the force by which the contact lever retracts from the document transport path due to the action of gravity and the force by which the spring causes the contact lever to project to the document transport path, and thus the problem described above arises still more easily.

SUMMARY

An advantage of some aspects of the disclosure is to obtain a high possibility that it is possible to maintain an appropriate posture of the contact lever for a longer time in an image reader that employs a contact detecting unit that comes into contact with the document so as to detect passing of the document.

According to an aspect of the present disclosure, an image reader includes: the document transport path that is extended along a horizontal direction when the reader has a first posture and that transports the document; a transport roller that transports the document in the document transport path; a rotation-contact member that is provided upstream from the transport roller in the document transport path and rotates to have a posture in which a contact portion that comes into contact with the document blocks the document transport path and a posture in which the contact portion opens the document transport path; a pressing member that presses the rotation-contact member in a direction in which the contact portion blocks the document transport path; and a detecting unit that detects the posture of the rotation-contact member. A rotation center of the rotation-contact member is positioned on an upper side of the document transport path in the first posture and the contact portion projects from the upper side toward a lower side of the document transport path. A center-of-gravity position of the rotation-contact member is on a lower side from the rotation center in the first posture.

In this configuration, the first posture is one of the postures of the reader and means a posture in which the document transport path is extended along the horizontal direction, a posture that can be taken for a longest time of a service life of the reader, and a normal installation posture. The image reader according to the disclosure uses such features described above. In other words, the rotation-contact member, with which the leading end of the document comes into contact such that the rotation-contact member rotates, is positioned on the upper side of the document transport path, the contact portion projects from the upper side toward the lower side of the document transport path, and the center-of-gravity position of the rotation-contact member is on the lower side from the rotation center in the first posture. Therefore, the rotation-contact member can be lowered by its own weight without a need of the pressing force of the pressing unit and block the document transport path.

Therefore, in the first posture, that is, the posture that is highly likely to be taken for the longest time of the service life of the reader, it is possible to appropriately maintain the posture of the rotation-contact member in which the pressing force of the pressing unit does not act against a force by which the rotation-contact member retracts from the document transport path due to action of gravity. In addition, an unnecessary opposite force does not act on the pressing unit in the first posture, and thus it is possible to appropriately maintain the pressing force of the pressing unit over a long period.

In the image reader, the pressing member may have a pressing force set to an extent that a state in which the contact portion blocks the document transport path is maintained, when the posture of the reader is a second posture in which the document transport path is disposed along a perpendicular direction.

In this configuration, the pressing force of the pressing member is set to the extent that the state in which the contact portion blocks the document transport path is maintained, when the posture of the reader is the second posture in which the document transport path is disposed along the perpendicular direction. Therefore, it is possible to appropriately use the reader even when the reader has the second posture.

In the image reader, the center-of-gravity position may be closer to the rotation center than a position at which a leading end of the document bumps against the contact portion.

In this configuration, the center-of-gravity position is closer to the rotation center than the position at which the leading end of the document bumps against the contact portion. Therefore, it is possible to push up the rotation-contact member with a lighter force than that required in a configuration in which the center-of-gravity position is more separated from the rotation center than the position at which the leading end of the document bumps against the contact portion.

In the image reader, the contact portion may cover an entire region, through which the document is passable, in the document width direction that is a direction intersecting the document transport direction.

In this configuration, the contact portion covers the entire region, through which the document is passable, in the document width direction that is the direction intersecting the document transport direction, and thus it is possible to detect passing of the document regardless of the size of the document.

In the image reader, the contact portions may be provided at appropriate intervals along the document width direction.

In this configuration, the contact portions are provided at appropriate intervals along the document width direction. Therefore, it is possible to reduce the weight of the rotation-contact member, and it is possible to push up the rotation-contact member with a light force.

The image reader may further include a sensor unit that reads the document, and the sensor unit may hold the document in cooperation with the transport roller.

In this configuration, the image reader includes the sensor unit that reads the document, and the sensor unit holds the document in cooperation with the transport roller. Therefore, there is no need to provide a roller that is paired with the transport roller, and thus it is possible to achieve a reduction in cost of the reader.

The image reader may further include a control unit that receives a detection signal from the detecting unit and controls the transport roller, and the control unit starts driving of the transport roller and reading of the document after a predetermined time after the control unit detects that the rotation-contact member rotates by a leading end of the document, based on the detection signal.

In this configuration, the image reader includes the control unit that receives the detection signal from the detecting unit and controls the transport roller, and the control unit starts the driving of the transport roller and the reading of the document after a predetermined time after the control unit detects that the leading end of the document rotates the rotation-contact member, based on the detection signal. Therefore, it is possible to avoid missing a part of an image of the leading end of the document.

DESCRIPTION OF EXEMPLARY EMBODIMENTS

Figure 1:
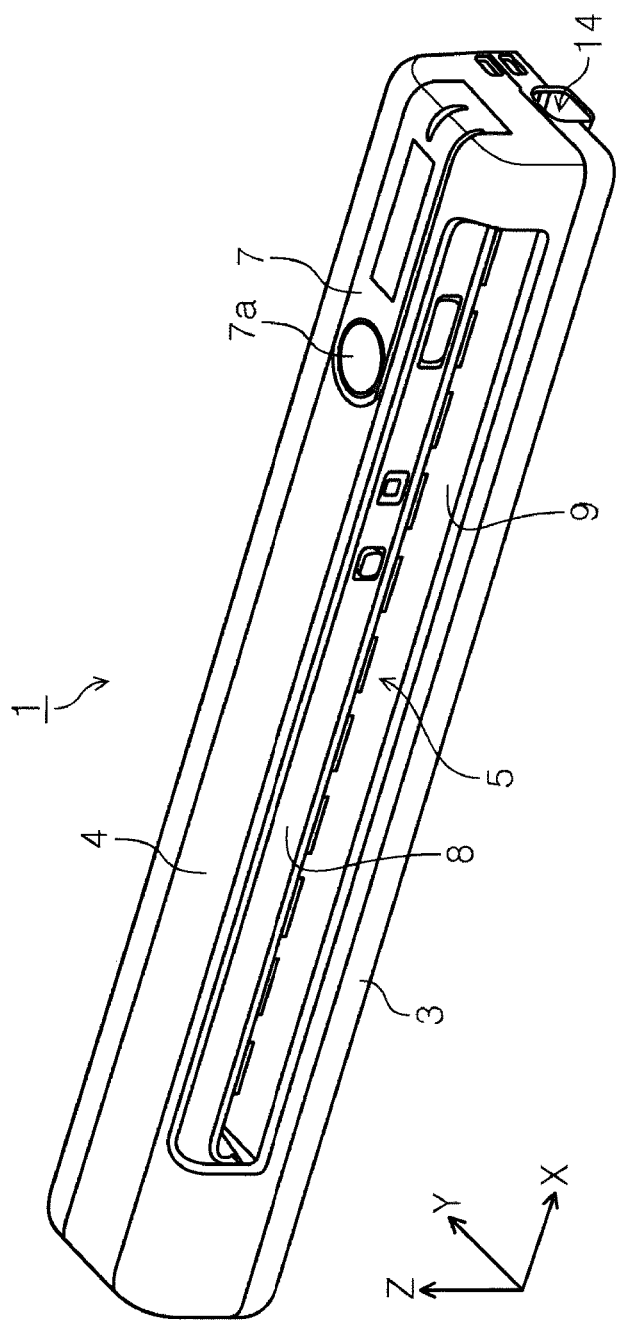
FIG. 1 is an external perspective view illustrating a scanner according to the present disclosure.

Hereinafter, embodiments of an image reader according to the present disclosure will be described with reference to the drawings. In this embodiment, an example of the image reader includes a handy scanner that is configured to read one of a front surface and a back surface of the document.

In the drawings, an X direction in an X-Y-Z coordinate system is an apparatus width direction or the document width direction that is a direction intersecting the document transport direction. In addition, a Y direction is the document transport direction. A Z direction is a perpendicular direction and an apparatus height direction. In addition, a +Y direction side is set as the document discharge direction, a right side and a left side are set as a +X direction and −X direction, respectively, when the document insertion opening 5 is in front.

In addition, a +Z direction is set as a vertically upward direction, and a −Z direction side is set as a vertically downward direction. In addition, a direction (+Y direction side), in which the document is transported, is referred to as "downstream", and an opposite direction (−Y direction side) thereof is referred to as "upstream".

A scanner 1 according to the embodiment is small and is a so-called handy scanner. Hence, an apparatus posture when an apparatus is used is not necessarily limited to a state illustrated in FIGS. 1 and 2, that is, a top surface (operation panel 7) of the apparatus is oriented toward the vertically upward direction and the document transport path T to be described below is disposed along a horizontal direction. However, unless particularly described hereinafter, a case where structures, positional relationships, or the like of configurational elements are described by words of an "upper side", a "lower side", or the like is described on a premise of a case where the apparatus is placed in a posture (normal posture) illustrated in FIGS. 1 and 2.

Figure 2:
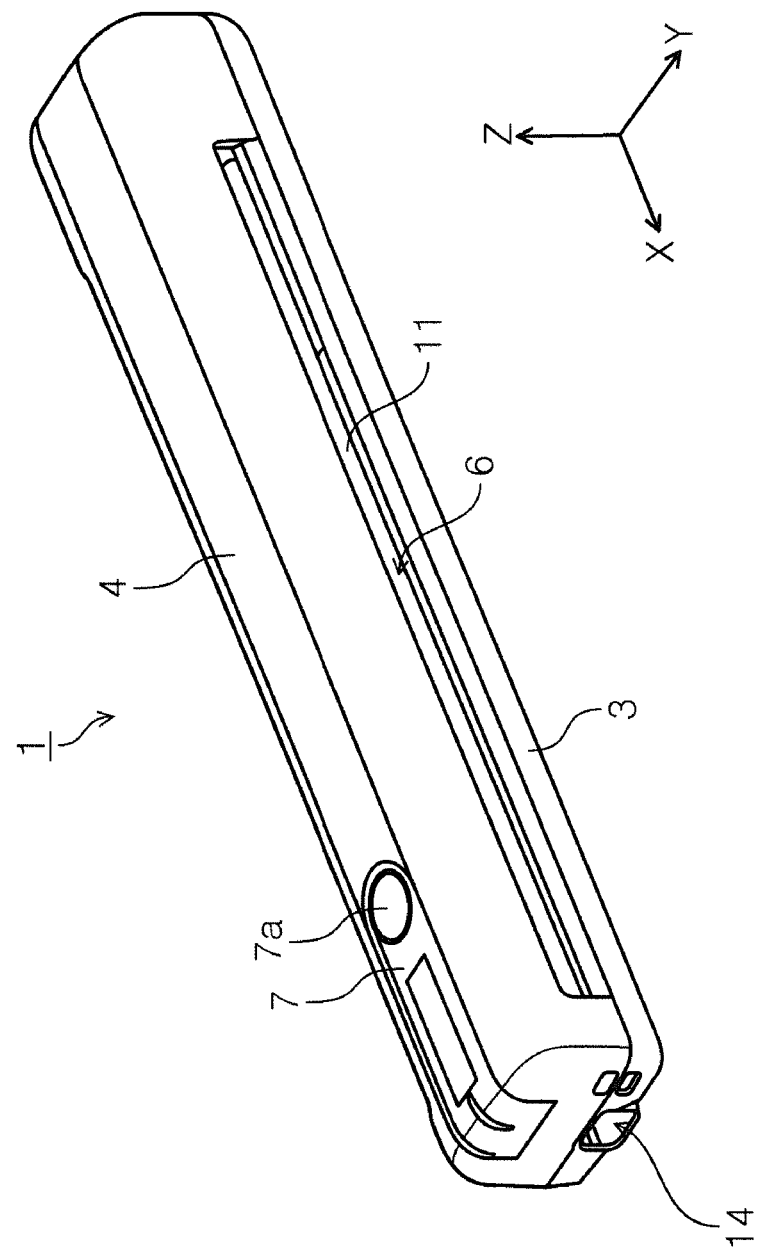
FIG. 2 is an external perspective view illustrating the scanner according to the present disclosure.

In FIGS. 1 and 2, the scanner 1 has an elongated shape along the X direction and has an external appearance that is substantially configured of an upper housing 4, an operation panel 7, and a lower housing 3. The operation panel 7 for performing various operations is provided on the +X direction side. A connector inserting opening 14 for coupling to an external device is open in a side surface on a side of the operation panel 7.

As illustrated in FIG. 1 in which the document insertion opening 5 is disposed in front, the document insertion opening 5 is formed between a path forming member 9 and a top frame 8.

In addition, as illustrated in FIG. 2 in which the document discharge opening 6 is disposed in front, the document discharge opening 6 is formed between the upper housing 4 and the lower housing 3, and a part of a transport roller 11 to be described below is viewed on an inner side of the document discharge opening 6.

Figure 3:
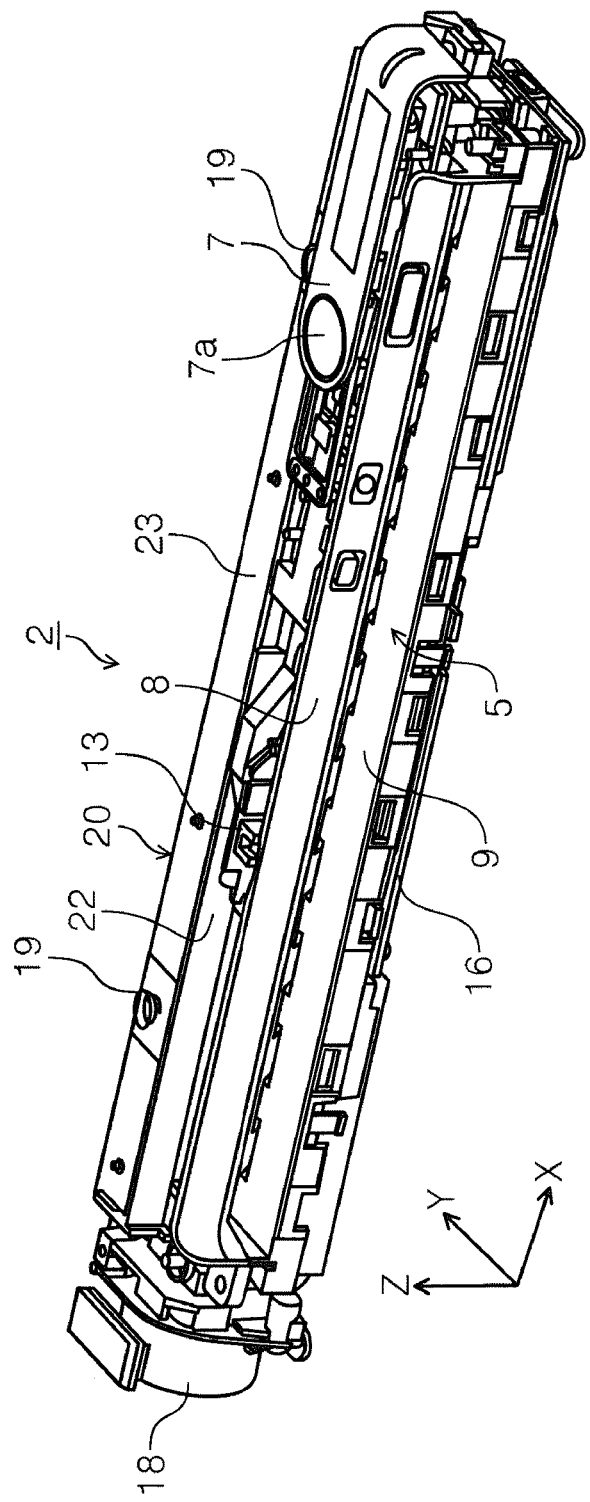
FIG. 3 is an external perspective view illustrating a state in which upper and lower housings are removed from the scanner according to the present disclosure.
Figure 4:
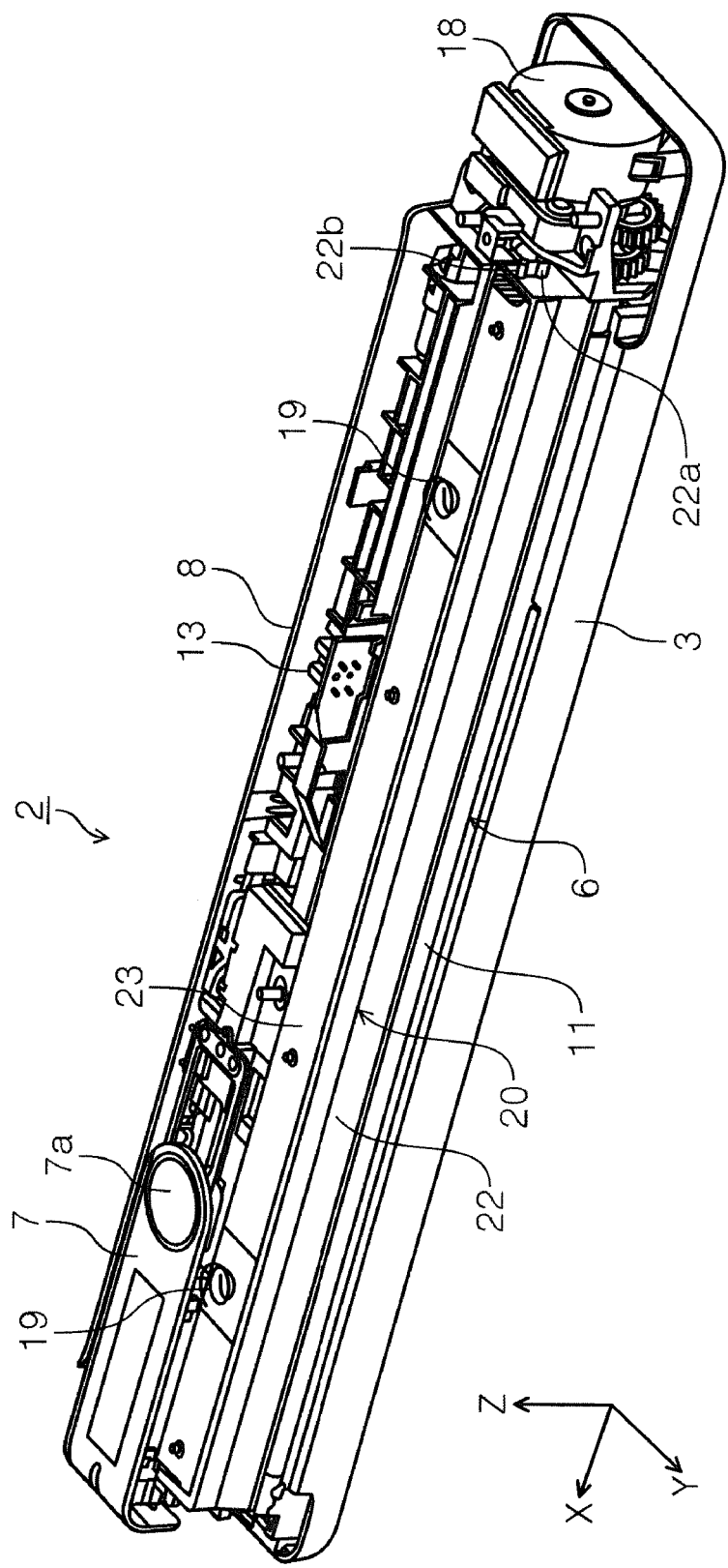
FIG. 4 is an external perspective view illustrating a state in which the upper housing is removed from the scanner according to the present disclosure.
Figure 5:
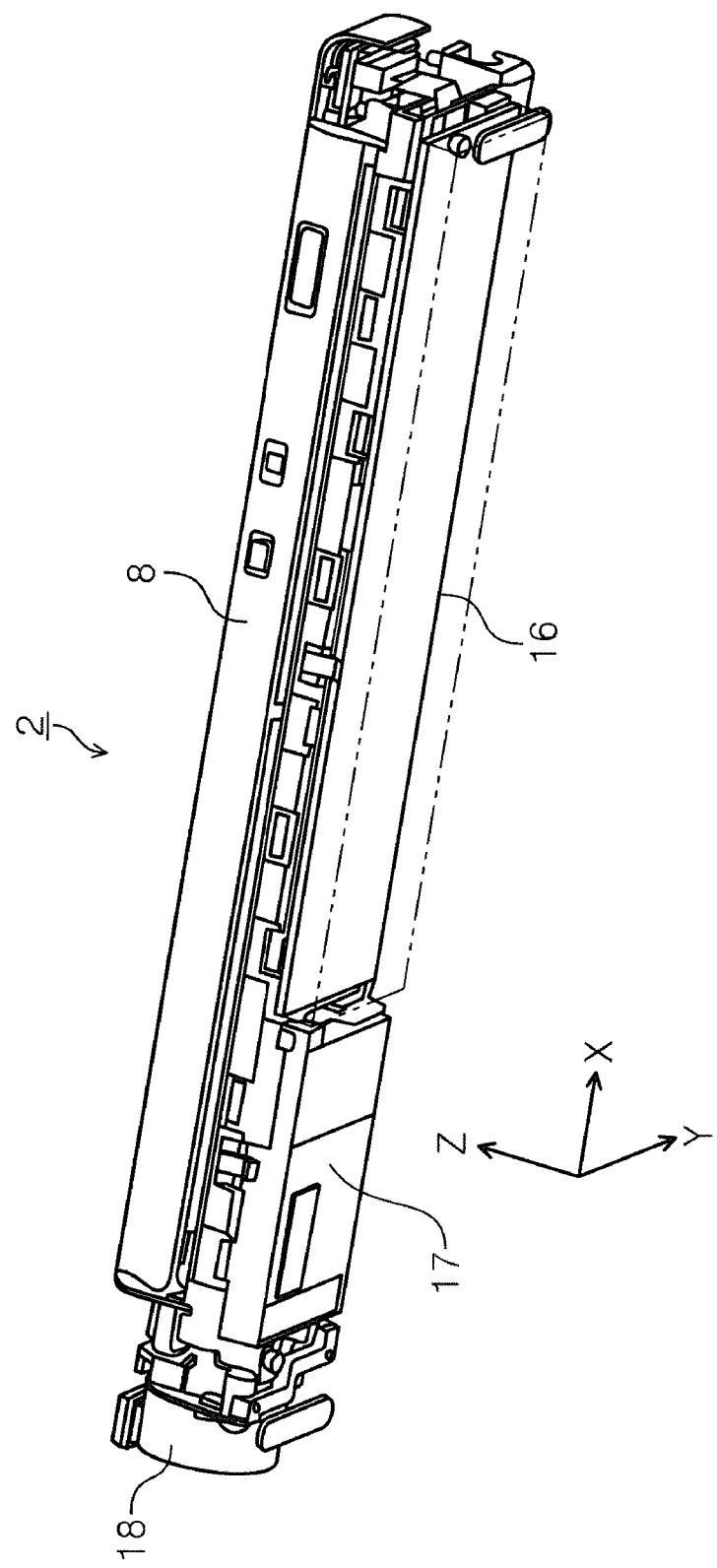
FIG. 5 is an external perspective view illustrating a state in which the upper and lower housings are removed from the scanner according to the present disclosure.

As illustrated in FIGS. 3 and 5 in which the upper housing 4 and the lower housing 3 are removed and FIG. 4 in which only the upper housing 4 is removed, an apparatus main body 2 of the scanner 1 is configured of a base body including the path forming member 9, which forms a lower side of the document transport path, and the top frame 8 and a sensor unit 20 which form an upper side of the document transport path. On the upper side of the document transport path, the top frame 8 forms a part of the document transport path which is formed upstream, and the sensor unit 20 forms a part of the document transport path which is formed downstream.

On the lower side from the path forming member 9, a battery 17 and a control unit 16 are provided as illustrated in FIG. 5 and configure a bottom portion of the apparatus main body 2. The control unit 16 has a configuration in which a plurality of electronic components are provided on a circuit board.

On a −X direction side of the apparatus main body 2, a motor 18 is provided and has a configuration in which power of the motor 18 is transmitted to the transport roller 11 as a drive roller to be described below.

Figure 6:
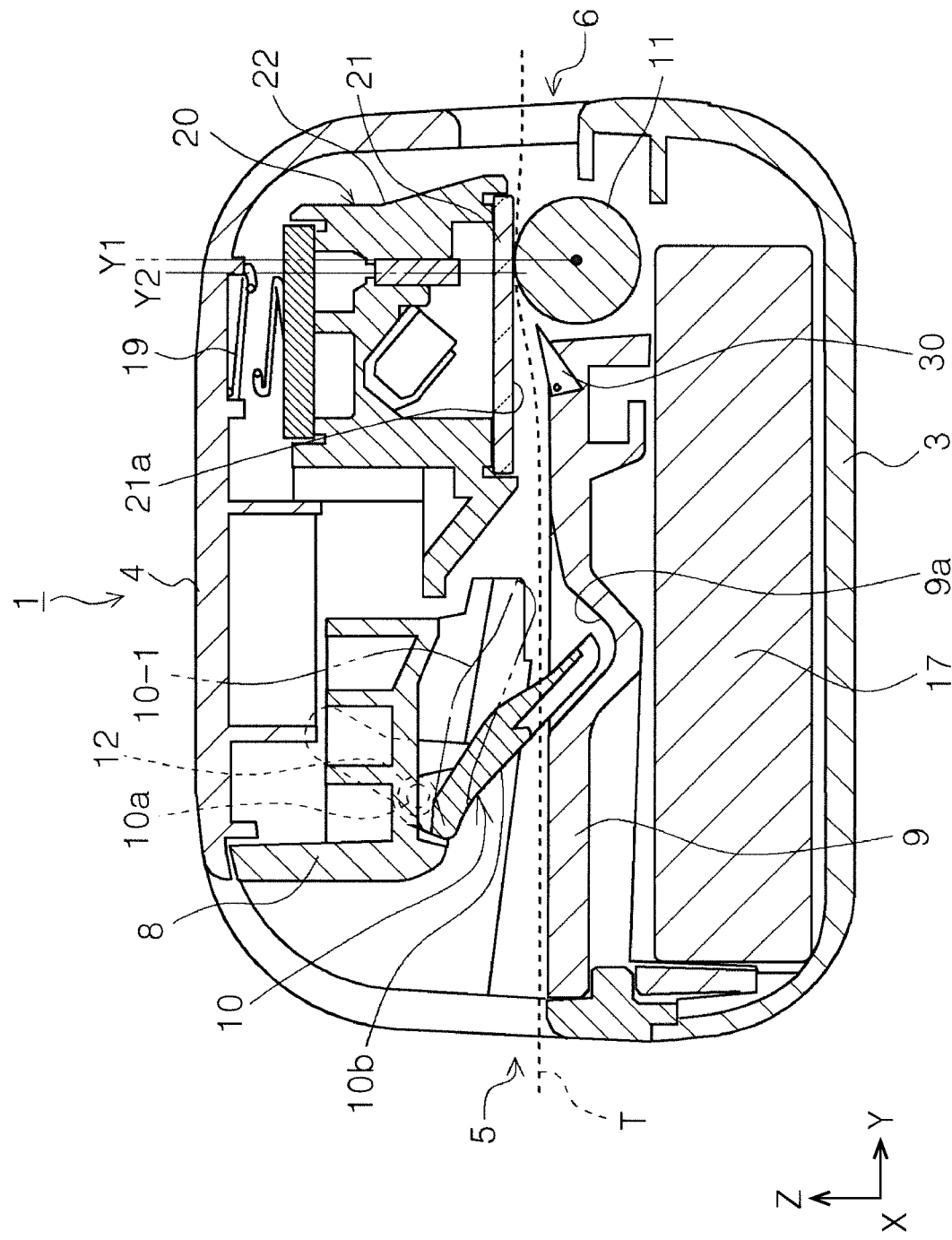
FIG. 6 is a sectional side view illustrating the document transport path in the scanner according to the present disclosure.

A dashed line represented by a reference sign T in FIG. 6 denotes the document transport path, and the document transport path T is disposed substantially along the horizontal direction in a normal posture of the scanner 1.

The document that is inserted from the document insertion opening 5 is moved toward a nip position by the transport roller 11 and the sensor unit 20 as an "document holding unit" while being guided by the path forming member 9. A user who uses the scanner 1 can obtain a feeling of bump contact feeling when the document is inserted from the document insertion opening 5 and a leading end of the document bumps against the nip position by the transport roller 11 and the sensor unit 20 or the leading end of the document bumps against the transport roller 11. In a manual mode, the leading end of the document is slightly nipped between the transport roller 11 and the sensor unit 20 through slight rotation of the transport roller 11. In this state (reading standby state), a scan button 7a (FIGS. 1 to 4) is pressed down, and thereby rotation of the transport roller 11 is started, and reading of the document is started. In an automatic mode, transport and reading of the document are automatically performed without pressing down of the scan button 7a, and this will be described below.

As illustrated in FIG. 6, the document detecting lever 10 is provided between the document insertion opening 5 and the transport roller 11. The document detecting lever 10 is provided to be rotatable around a rotary shaft 10a (also refer to FIG. 12) with respect to the top frame 8 in a side view of the document transport path T. The rotary shaft 10a is positioned on the upper side from the document transport path T, and a contact portion 10b is provided to project from the rotary shaft 10a to the document transport path T from the upper side to the lower side so as to block the document transport path T.

A coil spring 12 as an example of a pressing unit is provided on the rotary shaft 10a of the document detecting lever 10 and presses the document detecting lever 10 in a direction (clockwise direction in FIG. 6) in which the contact portion 10b projects to the document transport path T.

The document detecting lever 10 is provided with a detection target portion 10d (FIG. 12), and the detection target portion 10d blocks an optical axis of a sensor 13 (FIGS. 3 and 4), which is an optical sensor provided on the top frame 8, or is moved away from the optical axis, by rotation of the document detecting lever 10.

When the document is inserted from the document insertion opening 5, the leading end of the document pushes up the contact portion 10b, and the document detecting lever 10 rotates as illustrated by a reference sign 10-1. In other words, the document detecting lever 10 rotates to have a posture in which the contact portion 10b that comes into contact with the document blocks the document transport path T and a posture in which the contact portion 10b opens the document transport path T.

In the configuration described above, the control unit 16 (FIG. 5) of the scanner 1 can detect whether or not the document is inserted into the document transport path T based on a detection signal that is transmitted from the sensor 13 as an example of a detecting unit that detects the posture of the document detecting lever 10.

Figure 11:
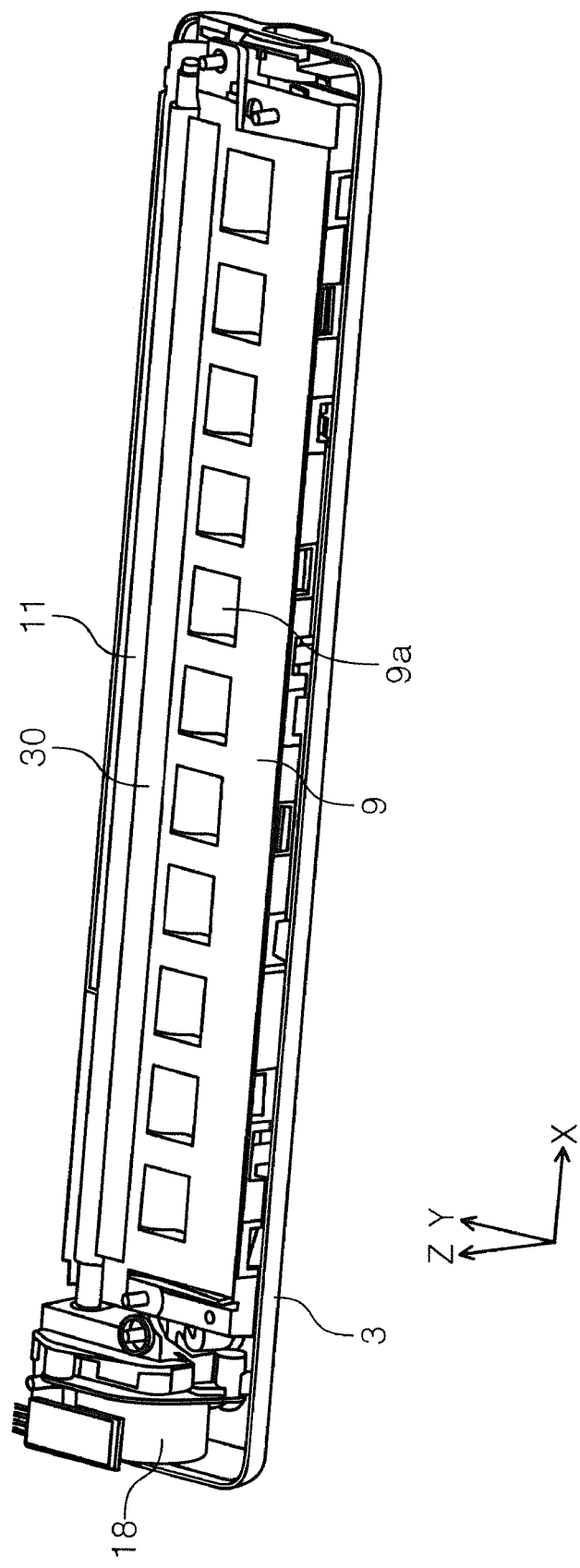
FIG. 11 is a view illustrating a path forming member and the ushering unit entirely.
Figure 12:
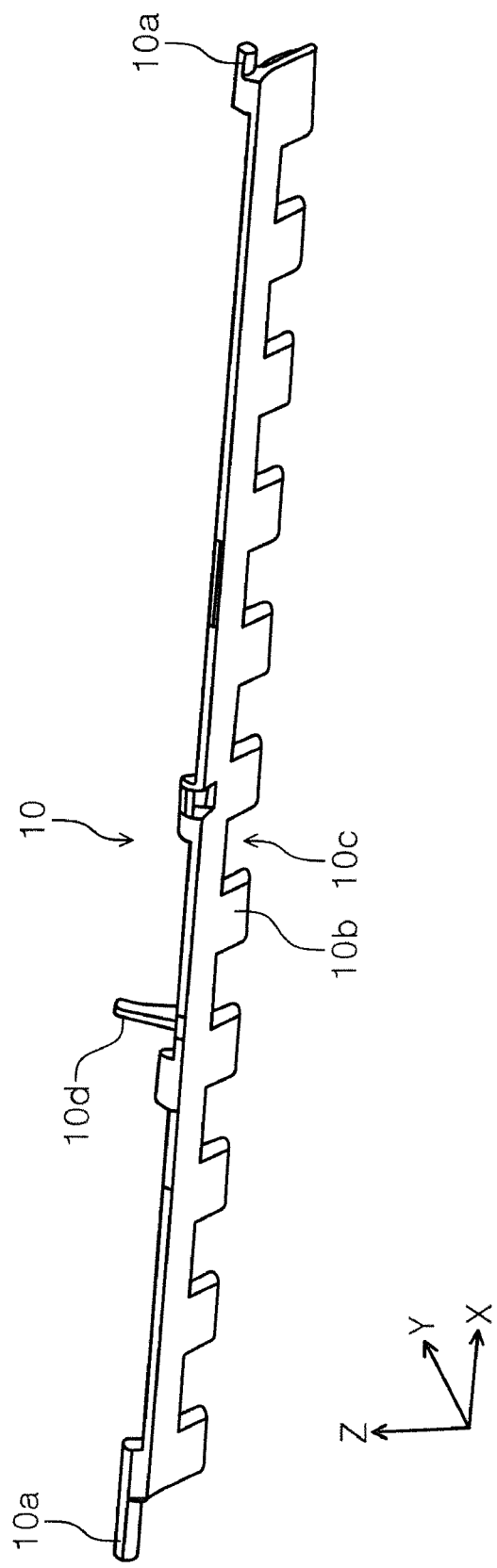
FIG. 12 is an overall perspective view of the document detecting lever.

The document detecting lever 10 is provided with the contact portions 10b and recessed portions 10c which are alternately formed in a longitudinal direction (X direction) as illustrated in FIG. 12. On the other hand, the path forming member 9 is provided with recessed portions 9a at predetermined intervals along the X direction (FIG. 11), and the contact portions 10b enter the recessed portions 9a. In this manner, the contact portions 10b can block the document transport path T.

Next, in the embodiment, the sensor unit 20 is configured as a contact image sensor module (CISM) and includes a glass plate 21 that forms a reading surface 21a on the lower side from a frame 22 that configures the base body.

The sensor unit 20 is provided to be displaced along a vertical direction so as to perform nipping documents having various thicknesses such that the document is nipped between the glass plate 21 and the transport roller 11.

Figure 7:
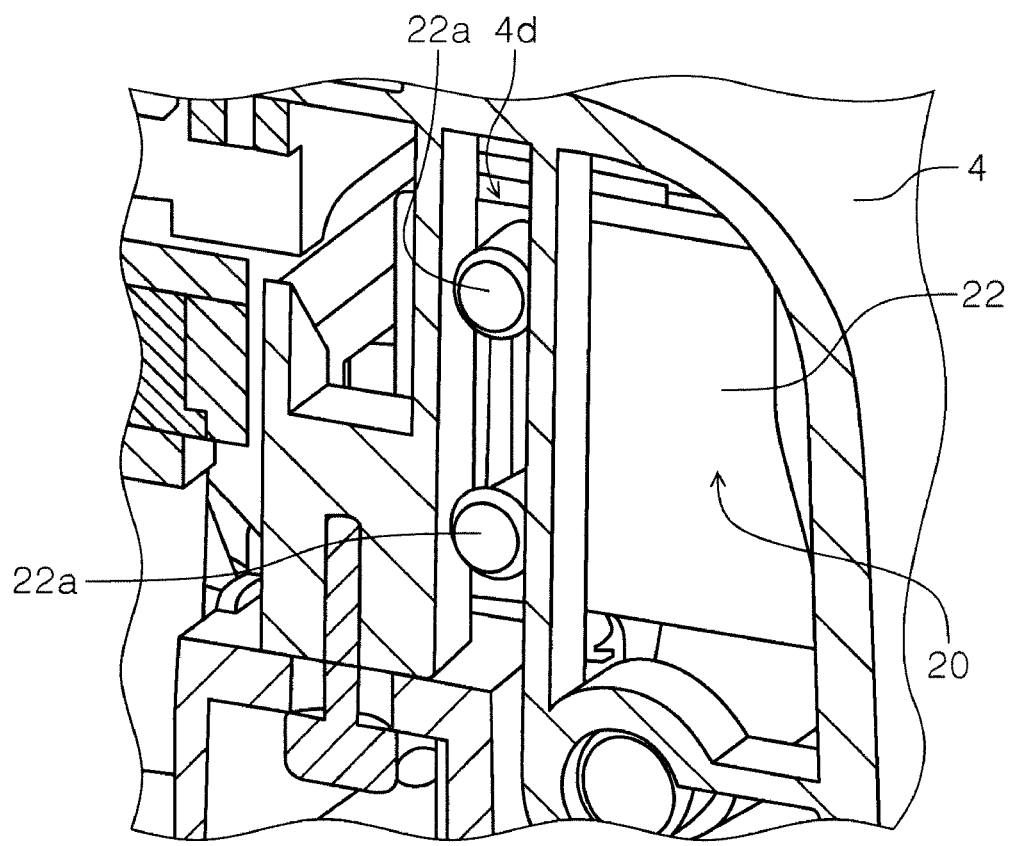
FIG. 7 is a perspective view of a partial cross section of the scanner according to the present disclosure.

As illustrated in FIG. 7, an end portion of the upper housing 4 in the +X direction is provided with a guide groove 4d that is extended along the vertical direction and has a configuration in which protrusions 22*a* and 22*a* formed on the frame 22 that configures the sensor unit 20 enter the guide groove 4*d* and are guided along the vertical direction.

Figure 8:
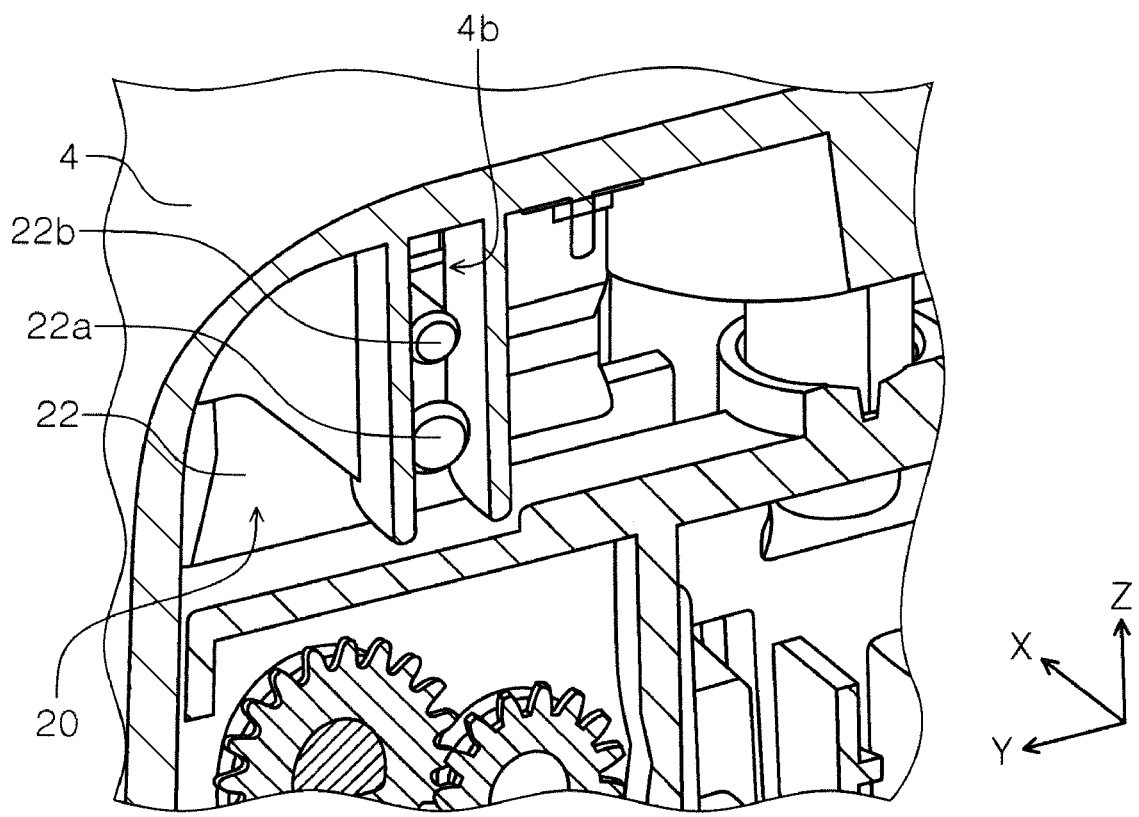
FIG. 8 is a perspective view of a partial cross section of the scanner according to the present disclosure.

In addition, as illustrated in FIG. 8, an end portion of the upper housing 4 in the −X direction is provided with a guide groove 4*b* that is extended along the vertical direction and has a configuration in which protrusions 22*a* and 22*b* formed on the frame 22 that configures the sensor unit 20 enter the guide groove 4*b* and are guided along the vertical direction.

The protrusion 22*b* illustrated in FIG. 8 has a diameter that is slightly smaller than a diameter of the protrusion 22*a*, and a certain size of play space is secured between the guide groove 4*b* and the protrusion 22*b*. Consequently, while a posture of the sensor unit 20 is stabilized, smooth displacement of the sensor unit 20 along the vertical direction is more secured than in a configuration in which all of the protrusions are formed to have the same diameter.

A circuit board 23 is provided on a top surface of the sensor unit 20 as illustrated in FIGS. 3, 4, and 6, and springs 19 that exert a pressing force are provided between the circuit board 23 and the upper housing 4. In the embodiment, two springs 19 are compression springs and are provided at an interval along the X direction. The sensor unit 20 is pressed by the spring 19 in a downward direction, and thus the glass plate 21 comes into press contact with the transport roller 11.

Here, a position Y1 in FIG. 6 is a rotation center position of the transport roller 11 and also a contact center position with the glass plate 21. In addition, a position Y2 is a reading position of the sensor unit 20. As illustrated in FIG. 6, the position Y2 is positioned slightly deeper on an inner side (upstream) in the apparatus than the position Y1. Consequently, deterioration of reading quality due to an influence of external light entering the inside of the apparatus from the document discharge opening 6 is suppressed.

The transport roller 11 is formed by providing an elastic material (for example, elastomer) on an outer circumferential surface of a metal shaft. Hence, the elastic material is crushed in a contact part of the transport roller with the glass plate 21, and thus a contact region between the transport roller 11 and the glass plate 21 has a predetermined length (for example, about 1 mm) in the document transport direction. The reading position Y2 is positioned in the contact region between the transport roller 11 and the glass plate 21, the contact region being formed due to crushing of the transport roller 11.

Subsequently, an ushering unit provided in an upstream portion from the transport roller 11 will be described with reference to FIGS. 9 and 10. In the scanner 1 according to the embodiment, the document is transported and discharged in a face-up state such that the sensor unit 20 is disposed on the upper side of the document transport path T. Therefore, the scanner has a configuration in which it is possible to insert the document while content of the document is checked and which is easy for the user to use. Additionally, there is no need to provide a roller that is paired with the transport roller 11, and thus it is possible to achieve a reduction in cost of the apparatus. However, in the configuration, there is a concern that abnormal transport will occur without appropriate nipping of the document when the leading end of the document, which moves toward the nip position between the transport roller 11 and the sensor unit 20, comes into belly contact with the transport roller 11 and the user takes his/her hand off depending on a feeling of bump contact which is aroused in such a case.

In other words, a lower guide surface 9*b* that is the lower side of the document transport path T, that is, a top surface of the path forming member 9, is provided upstream from the transport roller 11 that is provided on the lower side in the document transport path T and is driven to apply a feed force to the document. A height position (position H0) of the lower guide surface 9*b* is lower than a highest position (position H2) of an outer circumferential surface of the transport roller 11. In such a configuration, there is a concern that the leading end of the document will come into belly contact with the transport roller 11.

In the scanner 1, an ushering unit 30 is provided downstream from the lower guide surface 9*b* and guides the document from the lower guide surface 9*b* to a position (for example, a position H1) on the outer circumferential surface of the transport roller 11, the position being higher than the lower guide surface 9*b*. Consequently, the leading end of the document inserted into the document transport path T is ushered to the high position H1 as illustrated in a process from the top to bottom figures in FIG. 9, and thereby it is possible to suppress belly contact of the leading end of the document with the transport roller 11 so as to realize appropriate transport.

The top surface of the ushering unit 30 is an ushering surface that ushers the leading end of the document to the high position. However, it is possible to appropriately set an inclination angle of the ushering surface when the leading end of the document is ushered to the high position. For example, the ushering surface may be continuous to a tangential line on the outer circumferential surface of the transport roller 11 in a side view of the document transport path T.

In addition, in the embodiment, the ushering unit 30 is configured to switch between a first state (the top figure in FIG. 9) in which the document is ushered to the position H1 on the outer circumferential surface of the transport roller 11, the position H1 being higher than the lower guide surface 9*b*, and a second state (the bottom figure in FIG. 10) in which the document is ushered to a position H0 that is lower than the position H1 to which the document is ushered in the first state.

Hereinafter, to be further described, the ushering unit 30 is provided to be rotatable around a rotary shaft 30*a* in a side view of the document transport path T, is pressed in an upward direction by a coil spring 31 as an example of a pressing unit, and maintains the first state. The ushering unit 30 is configured to stop rotation in an upward posture by a stopper not illustrated, as illustrated in top figures of FIGS. 9 and 10.

Figure 9:
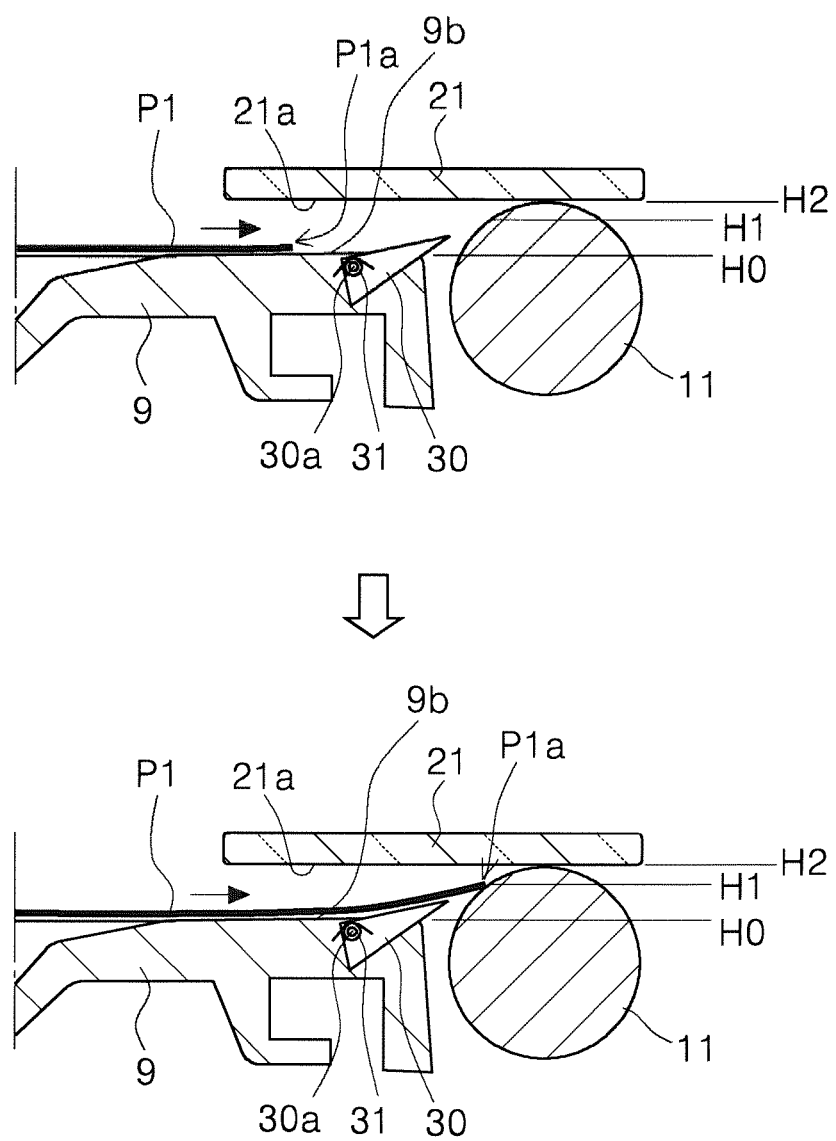
FIG. 9 is a view illustrating a state of an ushering unit when a thin document is inserted.

FIG. 9 is a view for describing movement of the ushering unit 30 when a thin document P1 such as plain paper having relatively low stiffness is inserted. When a leading end P1*a* of the document P1 reaches the ushering unit 30 as illustrated in the process from the top to bottom figures of FIG. 9, the leading end P1*a* is ushered to the position H1 higher than the position H0 (height position of the lower guide surface 9*b*) by the ushering unit 30 maintained in the first state. Consequently, the belly contact of the leading end P1*a* with the transport roller 11 is suppressed.

Figure 10:
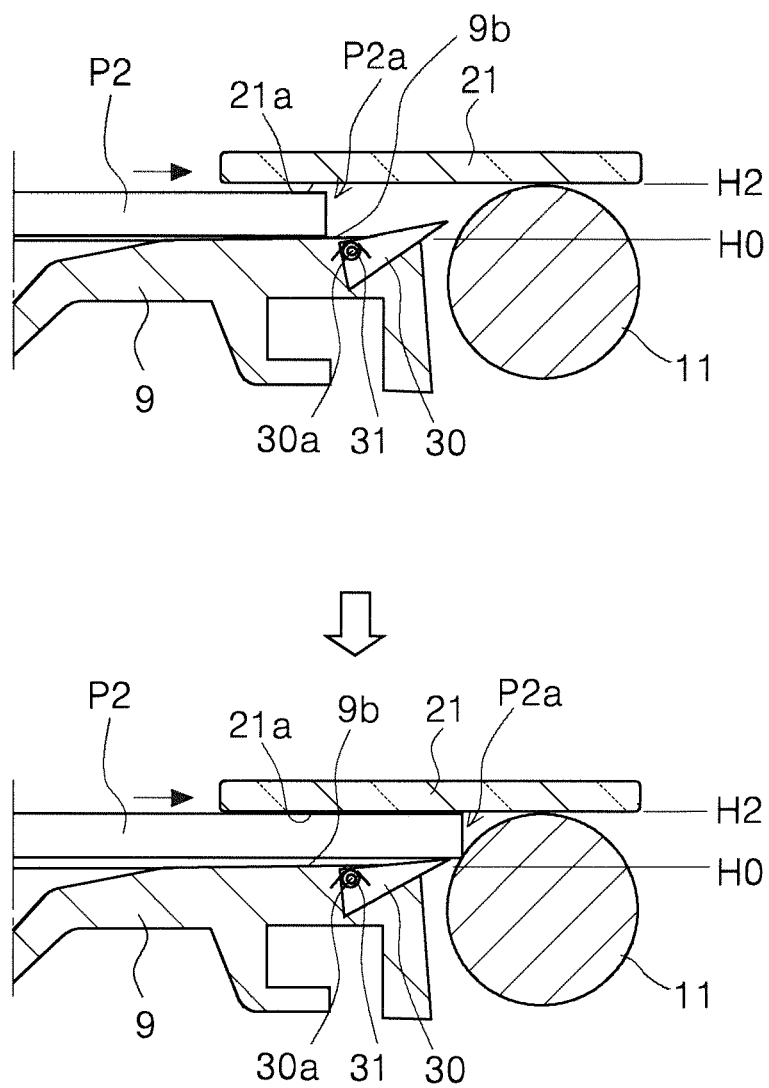
FIG. 10 is a view illustrating a state of the ushering unit when a thick document is inserted.

On the other hand, FIG. 10 is a view for describing movement of the ushering unit 30 when a thick document P2 such as a credit card or a cash card having high stiffness is inserted. When a leading end P2*a* of the document P2 reaches the ushering unit 30 as illustrated in a process from the top to bottom figures of FIG. 10, the document P2 pushes down the ushering unit 30, and thereby a lower corner of the leading end P2*a* comes into abutting contact with the outer circumferential surface of the transport roller 11 at the same height position substantially as the position H0 (height position of the lower guide surface 9b). The ushering unit 30 is pushed down by the document P2 because a gap between the glass plate 21 and a leading end of the ushering unit 30 in the first state is smaller than the thickness of the document P2. However, even when the gap between the glass plate 21 and the leading end of the ushering unit 30 in the first state is larger than the thickness of the document P2, the ushering unit 30 may be pushed down due to weight of the document P2, for example.

Similarly, it is possible to obtain a strong feeling of bump contact the document transport path T depending on types of documents, when the document is inserted into the document transport path T such that the leading end of the document is brought into abutting contact with the transport roller 11.

In other words, when the document having the high stiffness and the leading end of the document is ushered to the document nipping position by the transport roller 11 and the glass plate 21, the leading end of the document pushes up the sensor unit 20. As a result, there is a lack of the feeling of bump contact, and thus the leading end of the document may be inserted to a deep side than the document nipping position by the transport roller 11 and the glass plate 21. However, the ushering unit 30 comes into the second state, and thereby it is possible to obtain the strong feeling of abutting contact of the leading end of the document with the transport roller 11, and thus it is possible to position the document at the appropriate position.

An increase in feeling of bump contact of the leading end of the document with the transport roller 11 means that the leading end of the document comes into belly contact with the transport roller 11. However, even when the thick document is used, and the leading end comes into belly contact with the transport roller 11, the leading end is appropriately ushered to a space between the transport roller 11 and the glass plate 21 by rotation of the transport roller 11.

Hence, the scanner 1 according to the present disclosure is suitable for reading both the document thereof (thick document having high stiffness) and the document (thin document having low stiffness) with which abnormal transport occurs due to the belly contact with the transport roller 11.

The ushering unit 30 as described above maintains the first state when the medium P1 (FIG. 9) as an example of a first medium is inserted into the document transport path T and performs switching from the first state to the second state when the document P2 (FIG. 10) as a second medium that is thicker than the first medium is inserted into the document transport path T.

Consequently, there is no need to provide a dedicated unit that switches a state of the ushering unit 30, and thus it is possible to suppress an increase in cost of the apparatus.

The ushering unit 30 may be configured to come into a non-projection state from the lower guide surface 9b in the second state. Consequently, it is possible to more smoothly obtain the feeling of bump contact when the leading end of the document comes into bump contact with the transport roller 11.

In addition, In the embodiment, the ushering unit 30 is formed to have a size to cover the entire length along the document width direction (X direction) that is a direction intersecting the document transport direction (Y direction) as illustrated in FIG. 11. Consequently, regardless of a size of the document, the leading end of the document inserted into the document transport path T can be ushered to the high position on the outer circumferential surface of the transport roller 11, and thus it is possible to more reliably suppress the belly contact of the leading end of the document with the transport roller 11 so as to realize to appropriate transport.

In addition, In the embodiment, the document holding unit that nips the document in cooperation with the transport roller 11 is the sensor unit 20 of which a surface that is brought into contact with the transport roller 11 is configured of a reading surface and which reads the document, and the sensor unit 20 is provided to move toward and back from the transport roller 11. In this manner, the document holding unit is configured of the sensor unit 20, and thereby it is possible to contribute to a reduction in cost and size of the apparatus. In addition, the sensor unit 20 is configured to move toward and back from the transport roller 11, and thus it is possible to read documents having various thicknesses.

Figure 16:
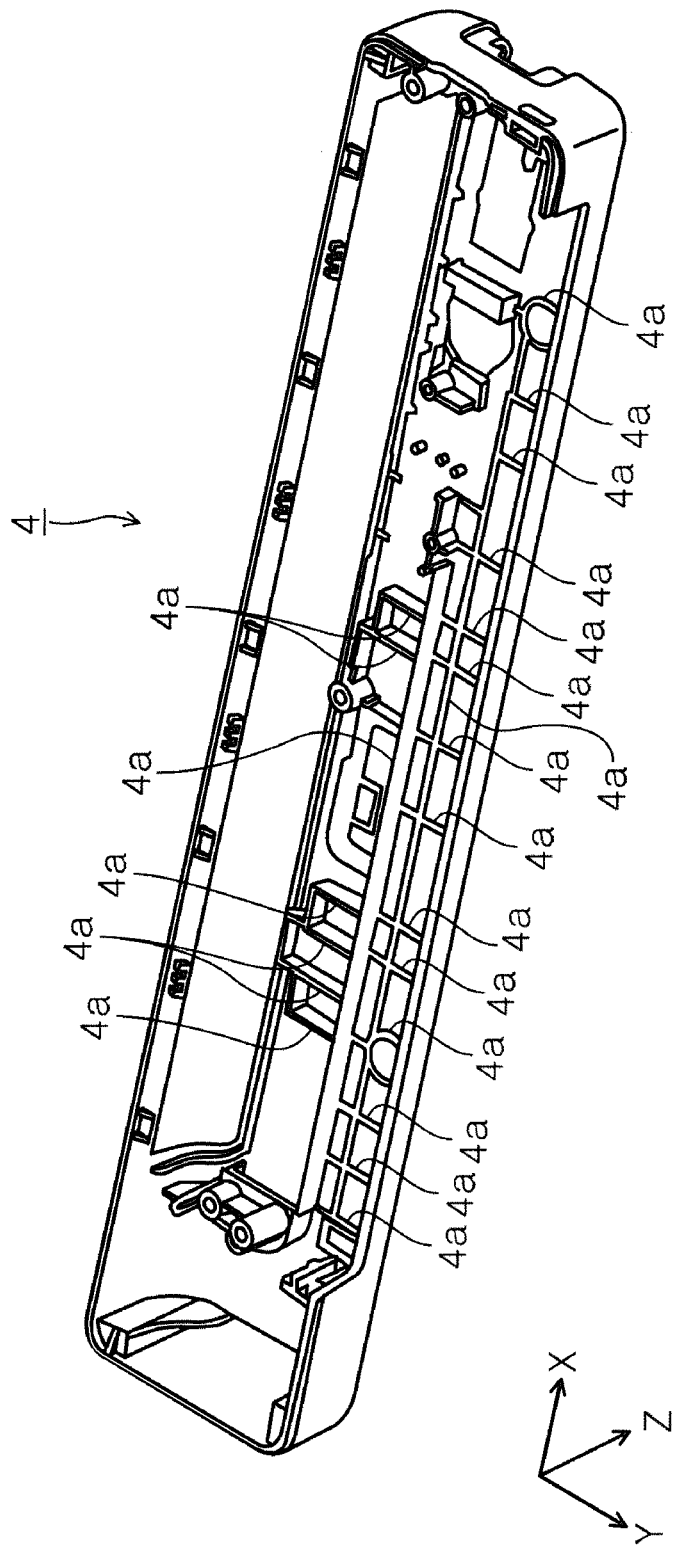
FIG. 16 is a perspective view illustrating an inner side of the upper housing.

The scanner 1 according to the embodiment further has the following features, in addition to features described above. First, the upper housing 4 is provided with a plurality of ribs 4a on a back side of the upper housing as illustrated in FIG. 16. The ribs 4a is configured of ribs that are extended mainly along the longitudinal direction (X direction) and ribs that are extended in the document transport direction (Y direction).

In this manner, the plurality of ribs 4a are formed on a back surface of the upper housing 4, and thereby it is possible to improve stiffness of the upper housing 4 and to smoothly suppress deformation when external pressure is applied.

Figure 17:
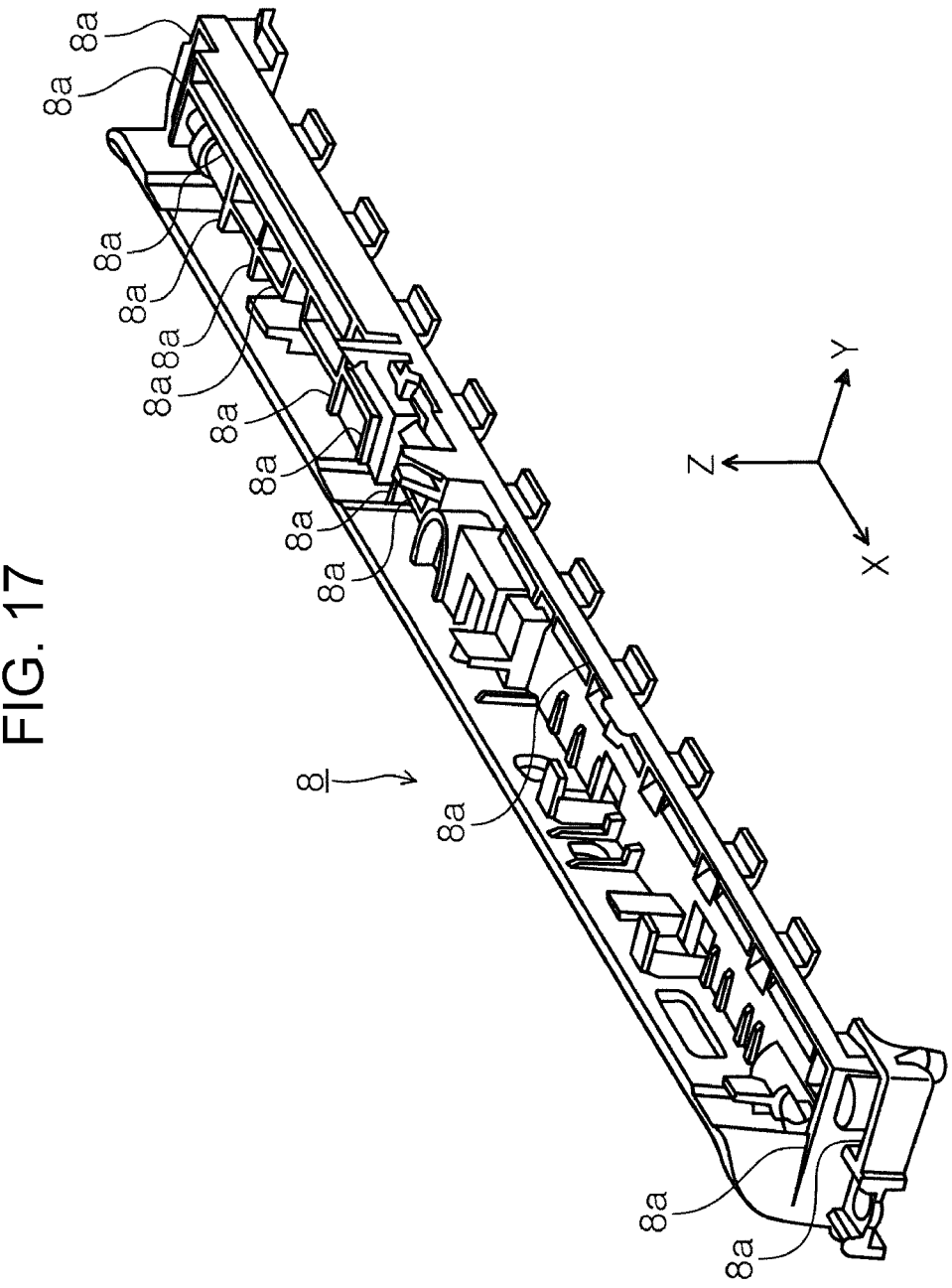
FIG. 17 is a perspective view of a top frame.

In addition, the top frame 8 is also provided with similar ribs 8a as illustrated in FIG. 17, and thereby the stiffness of the top frame 8 is improved, and deformation when the external pressure applied is further suppressed.

Figure 15:
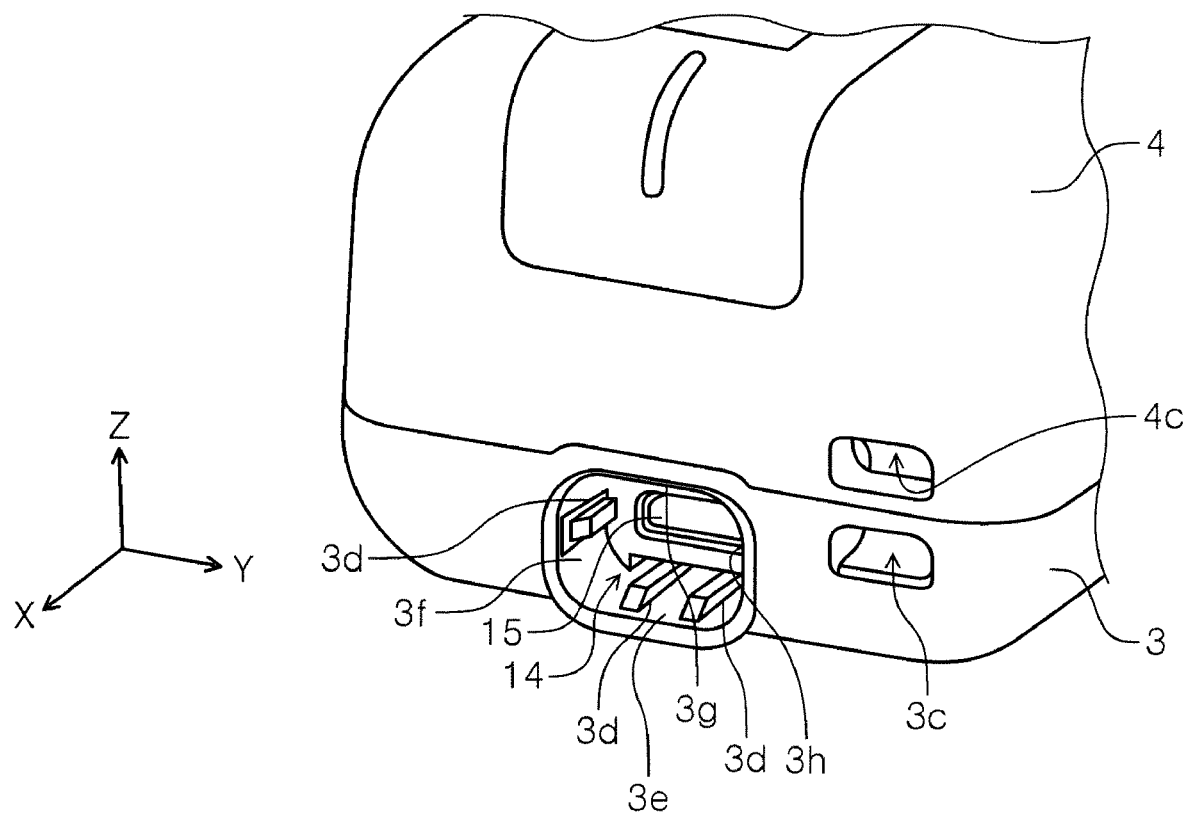
FIG. 15 is a perspective view illustrating one side surface of the scanner according to the present disclosure.

In addition, as illustrated in FIG. 15, a connector inserting opening 14 having a coupling unit 15 that is a coupling unit with an external device is formed by the lower housing 3. However, inner walls 3e, 3f, 3g, and 3h that form the connector inserting opening 14 are provided with a plurality of ribs 3d that are extended in a connector inserting direction. In FIG. 15, the ribs 3d formed on the inner wall 3g and the inner wall 3h are not illustrated because of an illustrated angle relationship therebetween. However, the inner wall 3g is provided with the ribs 3d similarly to the inner wall 3e, and the inner wall 3h is provided with the rib 3d similarly to the inner wall 3d.

Even when the connector is swayed in a state in which the connector (not illustrated) is inserted, the inner walls 3e, 3f, 3g, and 3h resists against the swaying with the plurality of ribs 3d, and it is possible to suppress movement of the connector (not illustrated) to the smallest extent and it is possible to suppress damage to the coupling unit 15.

In addition, holes 3c and 4c in FIG. 15 are strap passing holes. However, the hole 3c and the hole 4c are formed in the lower housing 3 and the upper housing 4, respectively. Therefore, it is possible to simplify a mold structure more than a case where both of the holes 3c and 4c are formed in one housing, and thus it is possible to achieve suppression of an increase in cost.

Figure 18:
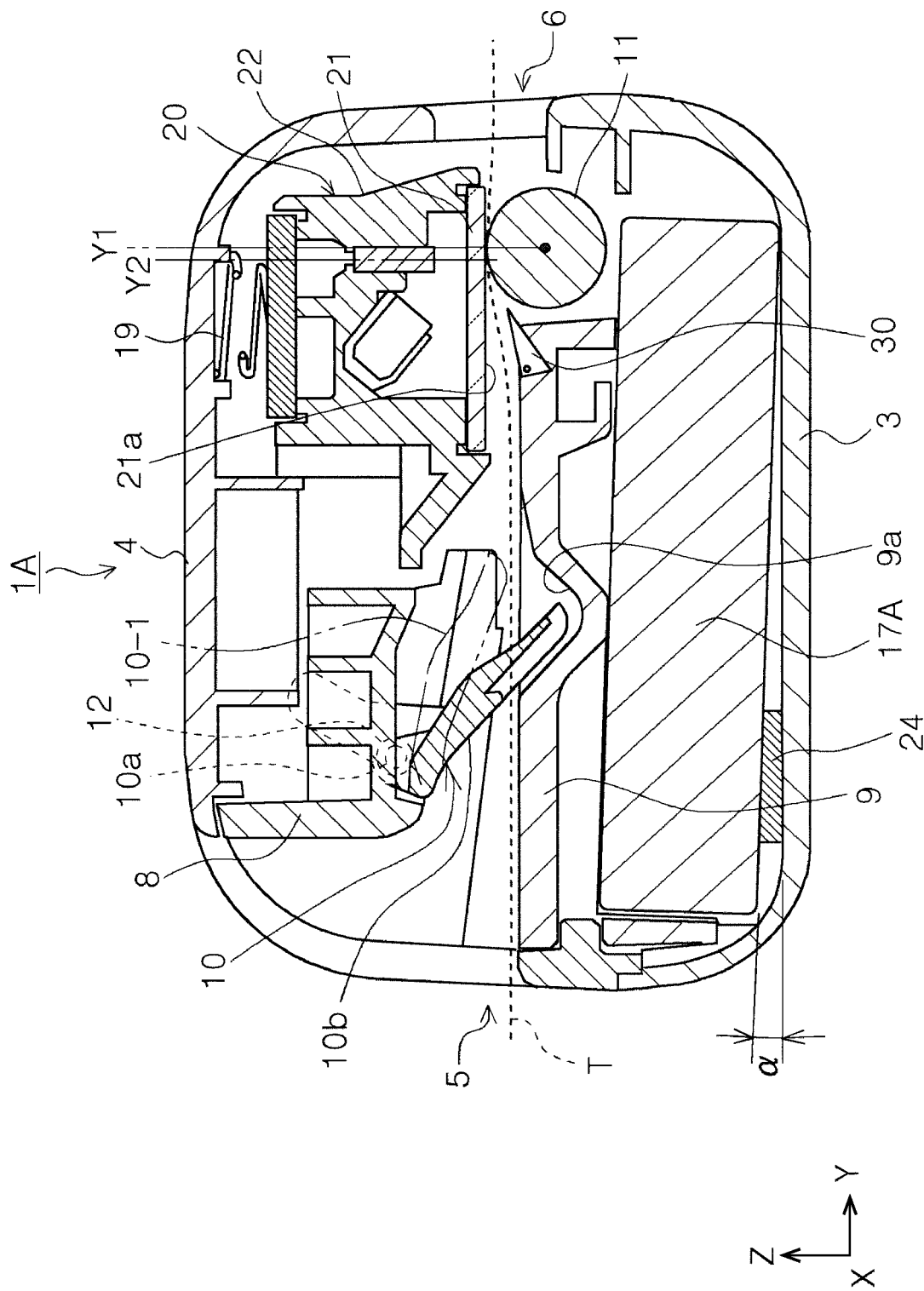
FIG. 18 is a sectional side view of a scanner according to another embodiment.

The battery that is provided in an apparatus bottom portion is also preferably provided in an inclined posture as illustrated in FIG. 18. In FIG. 18, a battery 17A that is provided in the apparatus bottom portion of a scanner 1A is provided in the inclined posture having an inclination angle α with respect to a horizontal plane such that the battery is high on a side of the document insertion opening 5 and is low on a side of the document discharge opening 6. Consequently, it is possible to house a battery as the battery 17A, of which a dimension along the Y direction is long, and thus it is possible to secure battery capacity. A reference sign 24 represents a vibration absorber that is formed of an elastic material such as sponge.

In addition, the scanner 1 includes the control unit (circuit board) 16 (FIG. 5) and the battery 17A on the lower side of the document transport path T, and the sensor unit 20 is provided on the upper side of the document transport path T. Therefore, while a vertical movement range of the sensor unit 20 is secured, it is possible to suppress an increase in size of the entire apparatus.

Subsequently, mainly with reference to FIGS. 13 and 14 and further the other drawings, the document detecting lever 10 as a rotation detecting member will be described in detail.

When a normal posture (posture in which the document transport path T is disposed along the horizontal direction) of the scanner 1 is set as the first posture, the scanner 1 may be used in a posture other than the first posture. Hereinafter, an installation posture (second posture) as an example of the posture of the scanner 1 in which the document transport path T is disposed along a perpendicular direction will be also described.

The document detecting lever 10 that is provided to detect whether the document is inserted from the document insertion opening 5 is configured of a contact detecting unit and is advantageous more than a transmissive or reflective optical sensor in terms of cost suppression or false detection suppression. However, when the posture of the scanner 1 changes, the contact portion 10b of the document detecting lever 10 retracts from the document transport path T due to action of gravity depending on the posture, and thus a spring force of the coil spring 12 which presses the document detecting lever 10 needs to be determined in consideration for not only one installation posture but also other installation postures.

When a state continues for a long period, in which the coil spring 12 causes the contact portion 10b of the document detecting lever 10 to project to the document transport path T against a force that causes the contact portion 10b of the document detecting lever 10 to retract from the document transport path T due to the action of gravity, there is a concern that, as time passes, a balance will be lost between a force by which the contact portion 10b of the document detecting lever 10 retracts from the document transport path T due to the action of gravity and a force by which the coil spring 12 causes the contact portion 10b of the document detecting lever 10 to project to the document transport path T, and it is not possible to appropriately maintain the posture of the document detecting lever 10.

In addition, when the spring force of the coil spring 12 increases, there is a concern that a force necessary for the leading end of the document to push up the contact portion 10b of the document detecting lever 10 will increase, thus, it is not possible for the leading end of the document having the low stiffness to push up the contact portion 10b of the document detecting lever 10, and jam will occur. When the spring force of the coil spring 12 is set to the minimum necessary degree in order to such a problem, a very delicate balance is kept between the force by which the contact portion 10b of the document detecting lever 10 retracts from the document transport path T due to the action of gravity and the force by which the coil spring 12 causes the contact portion 10b of the document detecting lever 10 to project to the document transport path T, and thus the problem described above arises still more easily.

In consideration for the problem described above, the document detecting lever 10 is disposed and configured as will be described below. In the normal posture (first posture) of the scanner 1, the rotary shaft (rotation center) 10a of the document detecting lever 10 is positioned on the upper side of the document transport path T as illustrated in FIG. 13, the contact portion 10b projects from the upper side toward the lower side of the document transport path T, and a center-of-gravity position G of the document detecting lever 10 is positioned on the lower side from the rotary shaft (rotation center) 10a.

Consequently, in the normal posture (first posture), the contact portion 10b of the document detecting lever 10 is lowered by its own weight without a need for the pressing force of the coil spring 12, and thus it is possible to block the document transport path T.

Therefore, in the normal posture (first posture), that is, the posture that is highly likely to be taken for the longest time of the service life of the apparatus, it is possible to appropriately maintain the posture of the document detecting lever 10 in which the pressing force (spring force) produced by the coil spring 12 does not act against the force by which the document detecting lever 10 retracts from the document transport path T due to the action of gravity. In addition, an unnecessary opposite force does not act on the coil spring 12 in the normal posture (first posture), and thus it is possible to appropriately maintain the spring force of the coil spring 12 over a long period.

Figure 14:
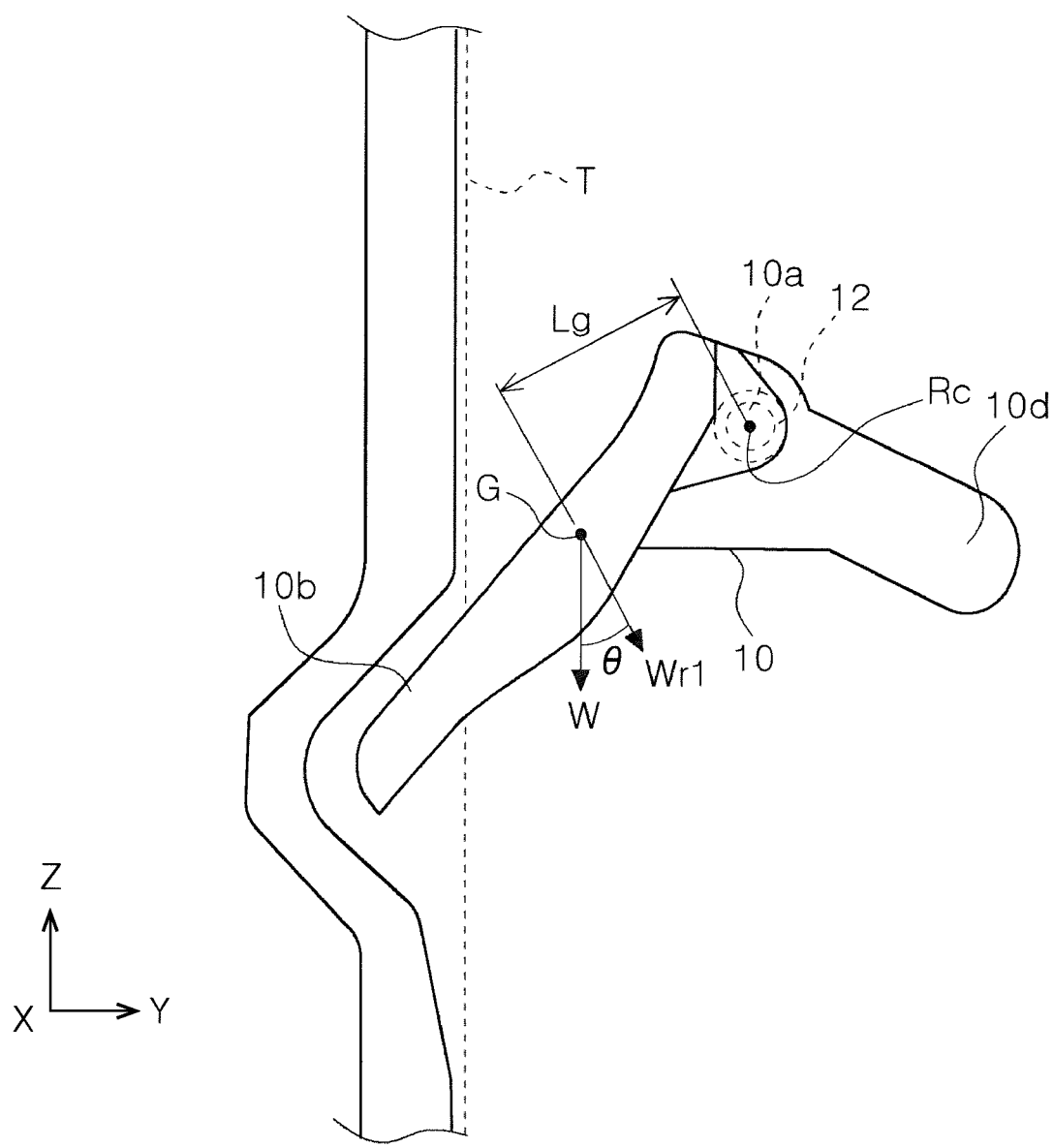
FIG. 14 is a diagram illustrating a force acting on the document detecting lever when the apparatus is placed in a vertical posture (second posture).

In addition, the spring force of the coil spring 12 is set to a degree to the extent that it is possible to maintain the state in which the contact portion 10b blocks the document transport path T, in a case where the posture of the scanner 1 is the second posture in which the document transport path T is disposed along the perpendicular direction as illustrated in FIG. 14.

Specifically, in FIG. 14, a reference sign G represents the center-of-gravity position of the document detecting lever 10, a reference sign W represents a weight of the document detecting lever 10, a reference sign Wr1 represents a component force of the weight W in a rotating direction, a reference sign Rc represents a rotation center position, a reference sign Lg represents a distance between the center-of-gravity position G and the rotation center position Rc, and a reference sign θ represents an angle formed between a direction of gravitational force and rotation moment that acts on the center-of-gravity position G.

In the state in FIG. 14, the minimum torque Tmin necessary for the coil spring 12 to maintain the posture (posture in which the contact portion 10b blocks the document transport path T) of the document detecting lever 10 can be represented by Expression (A).

$$Tmin = Lg \times Wr1 = Lg \times W \cos \theta \tag{A}$$

Hence, when rotational torque T that is applied to the document detecting lever 10 by the coil spring 12 is equal to or larger than the minimum torque Tmin, it is possible to maintain the state illustrated in FIG. 14. It is preferable that the spring force of the coil spring 12 be set in consideration for manufacturing variations of the document detecting lever 10, and the rotational torque T be set to a value obtained by adding a predetermined margin to the minimum torque Tmin.

Figure 13:
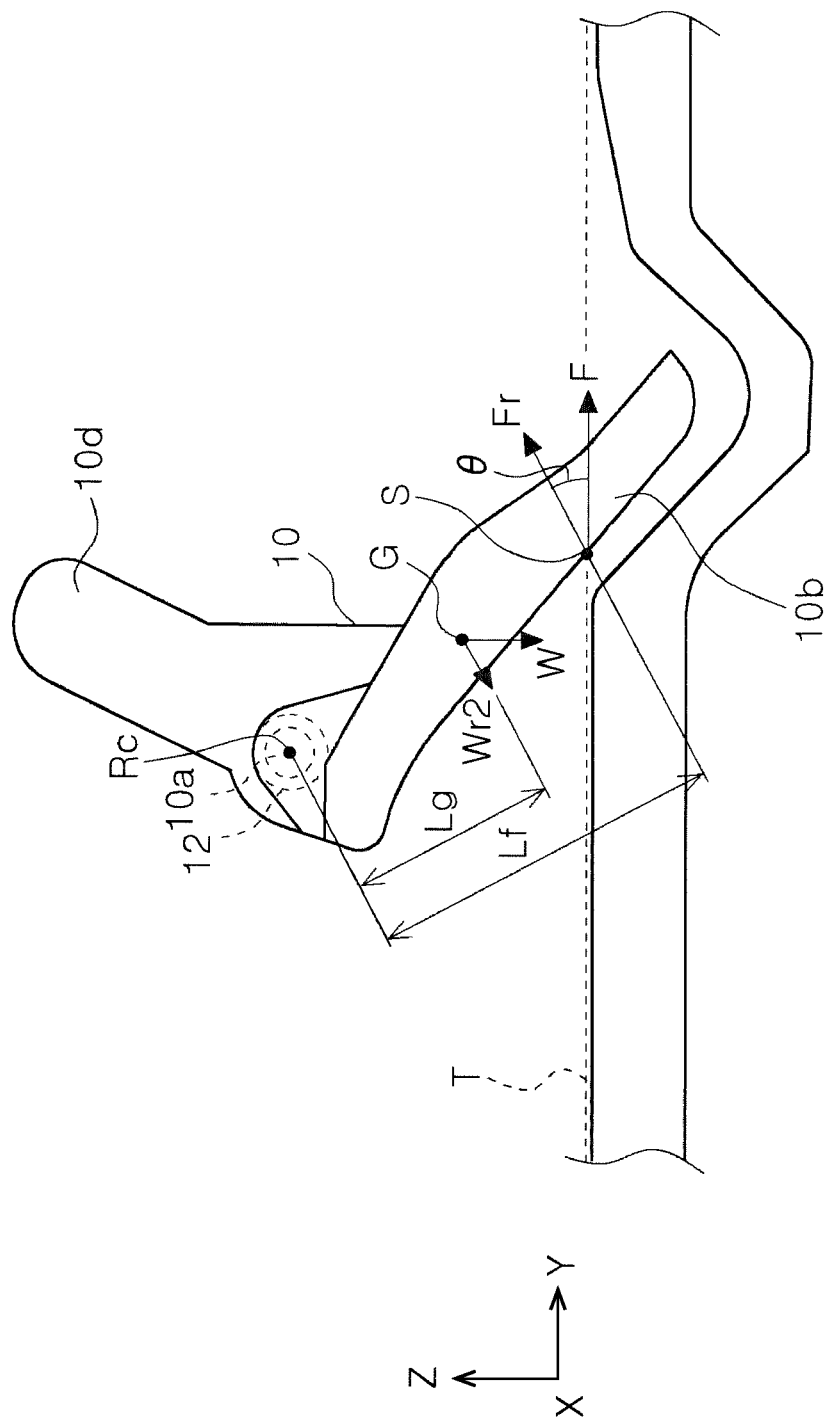
FIG. 13 is a diagram illustrating a force acting on the document detecting lever when an apparatus is placed in a horizontal posture (first posture).

FIG. 13 illustrates a force that acts on the document detecting lever 10 when the scanner 1 is in the normal posture (first posture), in which a reference sign F represents a force by which the leading end of the document pushes the contact portion 10b at a position S at which the leading end comes into contact with the contact portion 10b, a reference sign Fr represents a component force of a force F in the rotating direction, and a reference sign Lf represents a distance between the position S and the rotation center Rc. In addition, a reference sign Wr2 represents a component of the weight W in the rotating direction.

It is possible to obtain the minimum value Fmin of the force F, by which the leading end of the document can push up the contact portion 10b, by Expressions (B), (C), and (D).

$$F\text{min} \times \cos \theta = Fr \tag{B}$$

$$Fr \times Lf = F\text{min} \times \cos \theta \times Lf \geq Wr2 \times Lg + T\text{min} = W \sin \theta \times Lg + T\text{min} \tag{C}$$

$$F\text{min} \geq [W \sin \theta \times Lg + T\text{min}]/[\cos \theta \times Lf] = [W \sin \theta \times Lg + Lg \times W \cos \theta]/[\cos \theta \times Lf] = [Lg \times W \times (\sin \theta + \cos \theta)]/[\cos \theta \times Lf] \tag{D}$$

The minimum value Fmin of the force F, by which the leading end of the document can push up the contact portion 10b, is preferable to be set to a very small value, in consideration for a state in which it is possible to push up the contact portion 10b even in a case of the document having the low stiffness. From such a viewpoint, it is preferable to set a size or a material of the document detecting lever 10 or the spring force of the coil spring 12.

In addition, in the embodiment, the center-of-gravity position G is closer to the rotation center position Rc than the position S at which the leading end of the document bumps against the contact portion 10b. Consequently, it is possible to push up the document detecting lever 10 with a lighter force than that required in a configuration in which the center-of-gravity position G is more separated from the rotation center position Rc than the position S at which the leading end of the document bumps against the contact portion 10b.

In addition, in the embodiment, the contact portion 10b is formed along the document width direction (X direction) so as to cover the entire region in which the document is passable in the document width direction that is a direction intersecting the document transport direction (refer to FIG. 12), and thus it is possible to detect passing of the document regardless of the size of the document.

In addition, in the embodiment, since the contact portions 10b are provided at appropriate intervals along the document width direction (X direction) as illustrated in FIG. 12, it is possible to reduce the weight of the document detecting lever 10, and it is possible to push up the document detecting lever 10 with a lighter force.

The control unit 16 (FIG. 5) can execute an automatic mode for starting driving of the transport roller 11 and reading of the document after a predetermined time after the control unit detects that the leading end of the document rotates the document detecting lever 10 based on a detection signal that is received from the sensor 13 (FIGS. 3 and 4).

Figure 19:
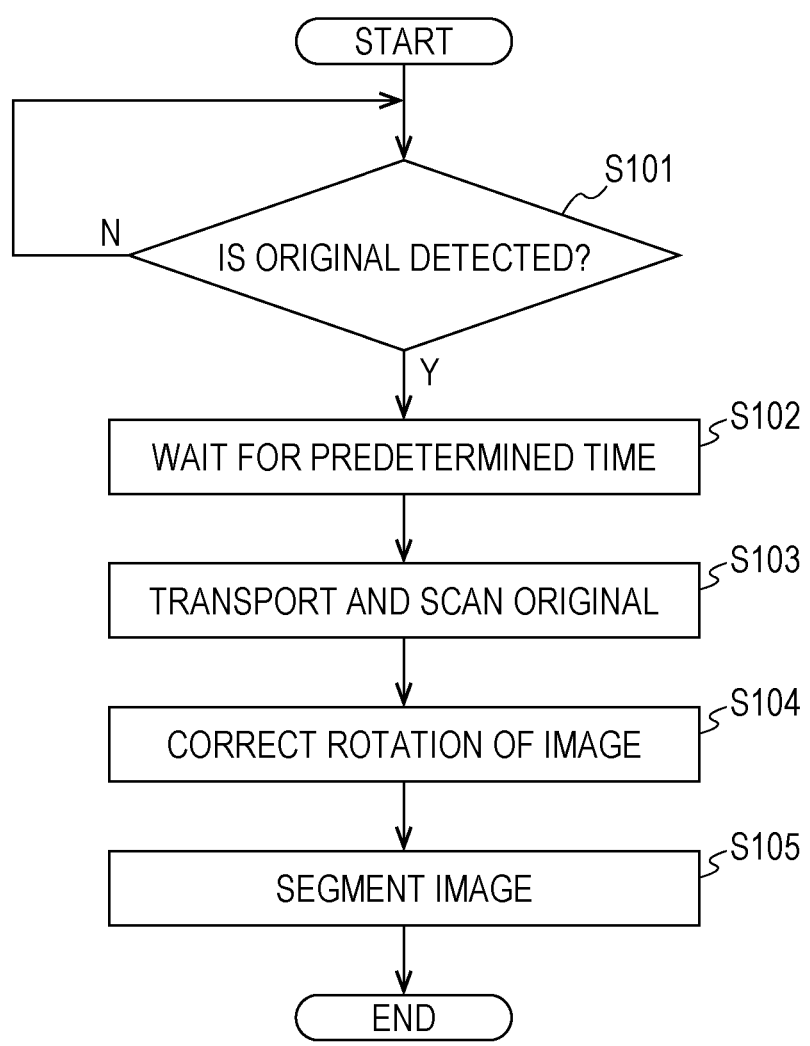
FIG. 19 is a flowchart illustrating control when the document is inserted.

To be described more specifically with reference to FIG. 19, when the control unit 16 detects that the leading end of the document passes based on the detection signal that is received from the sensor 13 (Yes in Step S101), the control unit sets waiting for a predetermined time (Step S102). For example, the waiting can be set to one second. When the leading end of the document reaches the nip position between the transport roller 11 and the sensor unit 20 during the waiting for the predetermined time in most cases, and thus the transport of the document, that is, the driving of the transport roller 11, and the reading of the document by the sensor unit 20 are started (Step S103).

Then, rotation correction of read image data is performed (Step S104), and an image of the document is segmented (Step S105). In Steps S104 and S105, image processing is performed.

In the automatic mode, the reading of the document is started before the leading end of the document is nipped between the transport roller 11 and the sensor unit 20, and thus it is possible to avoid missing of an image of the leading end of the document.

In the scanner 1 described above, the roller that feeds the document is configured of the single transport roller 11. However, the embodiment is not limited thereto, and a configuration may be employed, in which a plurality of rollers are provided. For example, a configuration may be employed, in which a pair of rollers is provided as a first roller pair, the sensor unit 20 is provided downstream from the first roller pair, and a second roller pair that is a pair of rollers is provided more downstream from the first roller pair. In a case of the configuration, one roller of the first roller pair can be the transport roller 11 according to the embodiment.

In addition, in the embodiment, the document holding unit that holds the document in cooperation with the transport roller 11 is configured of the sensor unit 20. However, the embodiment is not limited thereto, and a configuration may be employed, in which the document holding unit is configured of another member such as a roller as described above.

In addition, in the embodiment, the sensor unit 20 is provided on one side of the document transport path T. However, a configuration may be employed, in which the sensor unit is further provided on the other side and it is possible to read both surfaces of the document.

In addition, a case where characteristic configurations of the scanner 1 described above are described are applied to the scanner as an example of the image reader is described. However, the characteristic configurations can be applied to a recording apparatus represented by a printer, which includes a recording head that performs recording on a medium.

What is claimed is:

1. An image reader comprising:
   a document transport path that is extended along a horizontal direction when the reader has a first posture and that transports the document;
   a transport roller that transports the document in the document transport path;
   a rotation-contact member that is provided upstream from the transport roller in the document transport path and, the rotation-contact member rotates to have a posture in which a contact portion that comes into contact with the document blocks the document transport path and a posture in which the contact portion opens the document transport path;
   a pressing member that presses the rotation-contact member in a direction in which the contact portion blocks the document transport path; and
   a detecting unit that detects the posture of the rotation-contact member, wherein
   a rotation center of the rotation-contact member is positioned on an upper side of the document transport path in the first posture and the contact portion projects from the upper side toward a lower side of the document transport path, and
   a center-of-gravity position of the rotation-contact member is on a lower side from the rotation center in the first posture.

2. The image reader according to claim 1, wherein
   the pressing member has a pressing force set to an extent that a state in which the contact portion blocks the document transport path is maintained, when the posture of the reader is a second posture in which the document transport path is disposed along a perpendicular direction.

3. The image reader according to claim 1, wherein the center-of-gravity position is closer to the rotation center than a position at which a leading end of the document bumps against the contact portion.

4. The image reader according to claim 1, wherein the contact portion covers an entire region, through which the document is passable, in the document width direction that is a direction intersecting the document transport direction.

5. The image reader according to claim 4, wherein the contact portions are provided at appropriate intervals along the document width direction.

6. The image reader according to claim 1, further comprising:
a sensor unit that reads the document, wherein the sensor unit holds the document in cooperation with the transport roller.

7. The image reader according to claim 1, further comprising:
a control unit that receives a detection signal from the detecting unit and controls the transport roller, wherein the control unit starts driving of the transport roller and reading of the document after a predetermined time after the control unit detects that the rotation-contact member rotates by the leading end of the document, based on the detection signal.

8. The image reader according to claim 1, wherein a reading position, at which the document is read, is positioned upstream from a rotation center of the transport roller in a transport direction.

* * * * *